(12) United States Patent
Zhong

(10) Patent No.: US 11,307,307 B2
(45) Date of Patent: Apr. 19, 2022

(54) REFLECTOR MATCHING ALGORITHM BASED ON TRIANGLE PERIMETER MATCHING

(71) Applicant: Guangdong Jaten Robot & Automation Co., Ltd., Guangdong (CN)

(72) Inventor: Jiehui Zhong, Guangdong (CN)

(73) Assignee: Guangdong Jaten Robot & Automation Co., Ltd., Foshan (CN)

( * ) Notice: Subject to any disclaimer, the term of this patent is extended or adjusted under 35 U.S.C. 154(b) by 706 days.

(21) Appl. No.: 16/177,693

(22) Filed: Nov. 1, 2018

(65) Prior Publication Data
US 2019/0196018 A1   Jun. 27, 2019

(30) Foreign Application Priority Data
Dec. 22, 2017   (CN) .......................... 201711402090.7

(51) Int. Cl.
| | | |
|---|---|---|
| *G01C 3/08* | (2006.01) | |
| *G01S 17/48* | (2006.01) | |
| *G01S 7/48* | (2006.01) | |
| *G01S 17/06* | (2006.01) | |

(52) U.S. Cl.
CPC ............ *G01S 17/48* (2013.01); *G01S 7/4808* (2013.01); *G01S 17/06* (2013.01)

(58) Field of Classification Search
CPC .................................. G01S 17/48; G01S 7/484
See application file for complete search history.

(56) References Cited

U.S. PATENT DOCUMENTS 4,647,784 A * 3/1987 Stephens ................. G01S 17/87
250/559.3

FOREIGN PATENT DOCUMENTS

WO   WO2018208751 A1 * 11/2018   ............. G06T 19/00

\* cited by examiner

*Primary Examiner* — Mark Hellner

(57) ABSTRACT

A reflector matching algorithm based on triangle perimeter matching includes recording the position information of known reflectors in a map one by one, generating a scene coordinate point layout, taking points of the recorded reflectors and freely combining basic triangles with all side lengths not exceeding twice of the maximum detection distance of a laser sensor; recording all the combined basic triangles, then recording the corresponding side lengths, the position of each vertex, and the perimeter of each basic triangle, and saving the records in an AGV; reading the angle and distance information of the reflectors and freely combining detection triangles for the detected reflectors; and respectively calculating the side lengths and perimeters of the detection triangles, and searching and pairing in the basic triangle combination to determine the real-time position of the laser sensor.

6 Claims, 2 Drawing Sheets

REFLECTOR MATCHING ALGORITHM BASED ON TRIANGLE PERIMETER MATCHING

CROSS-REFERENCE TO RELATED APPLICATION

This application claims priority to and the benefit of Chinese Patent Application No. 201711402090.7 filed on Dec. 22, 2017, the entire content of which is incorporated herein by reference.

FIELD OF THE INVENTION

The present invention relates to the technical field of laser sensor positioning by using reflectors, and more particularly relates to a reflector matching algorithm based on triangle perimeter matching.

BACKGROUND OF THE INVENTION

A positioning and navigation technology based on a laser sensor is a key technology in the fields of industrial AGV, intelligent robots, and the like. Compared with a conventional rail navigation mode, the technology has the advantages of high positioning accuracy, flexibility, variability, and the like, and is suitable for complex and highly dynamic industrial scenes.

At present, a conventional laser sensor positioning technology usually needs to know the base position of an AGV in advance, and then positioning of the AGV after movement can be performed, i.e. the position coordinates at current moment can be calculated only based on the position coordinates at last moment. The positioning method cannot globally match the current coordinates, i.e. the position coordinates at current moment cannot be calculated if the position coordinates at last moment are unknown, and the current laser sensor positioning method needs great computation burden in each calculation of current position coordinates, which wastes time and affects working efficiency; besides, the conventional positioning technology also adopts polygon matching positioning, but the positioning method also has great computation burden, which affects working efficiency, and for the positioning method, error control is not liable to realize, so that the positioning accuracy is affected.

SUMMARY OF THE INVENTION

The present invention aims to overcome the defects existing in the prior art and provides a reflector matching algorithm based on triangle perimeter matching, which has comprehensive matching capability, high efficiency and low computation burden.

In order to solve the technical problem, a technical solution is proposed as follows.

A reflector matching algorithm based on triangle perimeter matching includes the following steps of:

a. recording coordinate information of a plurality of reflectors in an AGV travel scene, generating a scene coordinate point layout, and determining a maximum detection distance of a laser sensor;

b. taking and combining any three points in the scene coordinate point layout to form a plurality of basic triangles, calculating the perimeters of the basic triangles, the length of each side and the position of each vertex of the plurality of basic triangles, and saving information in an AGV;

c. extracting the basic triangles of which the side length is smaller than or equal to twice of the maximum detection distance of the laser sensor;

d. scanning individual reflectors of the plurality of reflectors which are within the maximum detection distance at the current position of the AGV, obtaining a plurality of detection triangles through matching by taking the scanned reflectors as vertexes, and calculating the side lengths and the perimeters of the detection triangles;

e. carrying out matching with the plurality of basic triangles by taking the perimeters of the plurality of detection triangles as features, and finding out all the basic triangles having consistent perimeter features with the detection triangles;

f. carrying out matching with all the basic triangles having consistent perimeter features matched in the step e by taking the side lengths of the plurality of detection triangles as features, and finding out all the basic triangles having consistent side length features with the detection triangles; and g. acquiring position information of each vertex of all the detection triangles, and carrying out average fusion according to the position information of each vertex and in combination with a map and a world coordinate list so as to determine the real-time position of the current AGV.

Compared with the prior art, the reflector matching algorithm based on triangle perimeter matching of the present invention, shall avoid the situation in which the reflectors in two areas are the same in layout and also avoid the situation in which the reflectors in a single area are symmetrical in layout (for example, the reflectors are arranged into a square or an equilateral triangle) when the reflectors are arranged, matching can be completed fast without knowing the position information at last moment by using the features of perimeters, corresponding side lengths or angles, and the like to obtain the real-time position of the laser sensor, and complex computations can be completed in advance. When the real-time position is detected, the real-time position coordinates of the laser sensor can be obtained only through simple computations and contrast fusion, the computation burden is greatly reduced, and the positioning efficiency is high.

Specially, in the step d, when the laser sensor scans the reflectors, the angle information of the reflectors and the distance information from the AGV to the reflectors can be obtained, and the detection triangles can be obtained by matching the angle information and the distance information.

Preferably, the laser sensor starts to scan counterclockwise from 0 degree in a horizontal direction and feeds back the angles and distances of scanned reflectors, and the distance length between every two detected reflectors is calculated according to the Cosine Law; the distance lengths and included angles of three sides of the detection triangle can be obtained using the Cosine Law. The length of each side and the angle information of the detection triangle can be obtained through simple arithmetical computations, and the computation speed is high.

Preferably, for the step b, all the basic triangles are recorded in a basic triangle array with the perimeter as a subscript in the AGV, and the basic triangles with the same calculated perimeters are saved via a chain table.

Particularly, for the step c, the side length being smaller than or equal to twice of the maximum detection distance of the laser sensor means that if the detection range of the laser sensor is L1 mm, the side length of the combined basic triangle does not exceed L2=(2*L1) mm. All the reflectors which can be combined into the basic triangles are ensured to be detected by the laser sensor.

Preferably, for the step e, when matching is carried out with the basic triangles by taking the perimeters as features, the array with certain perimeter error range as a subscript can be searched, and the basic triangles corresponding to the detection triangles can be found more accurately.

DETAILED DESCRIPTION OF THE INVENTION

Figure 1:
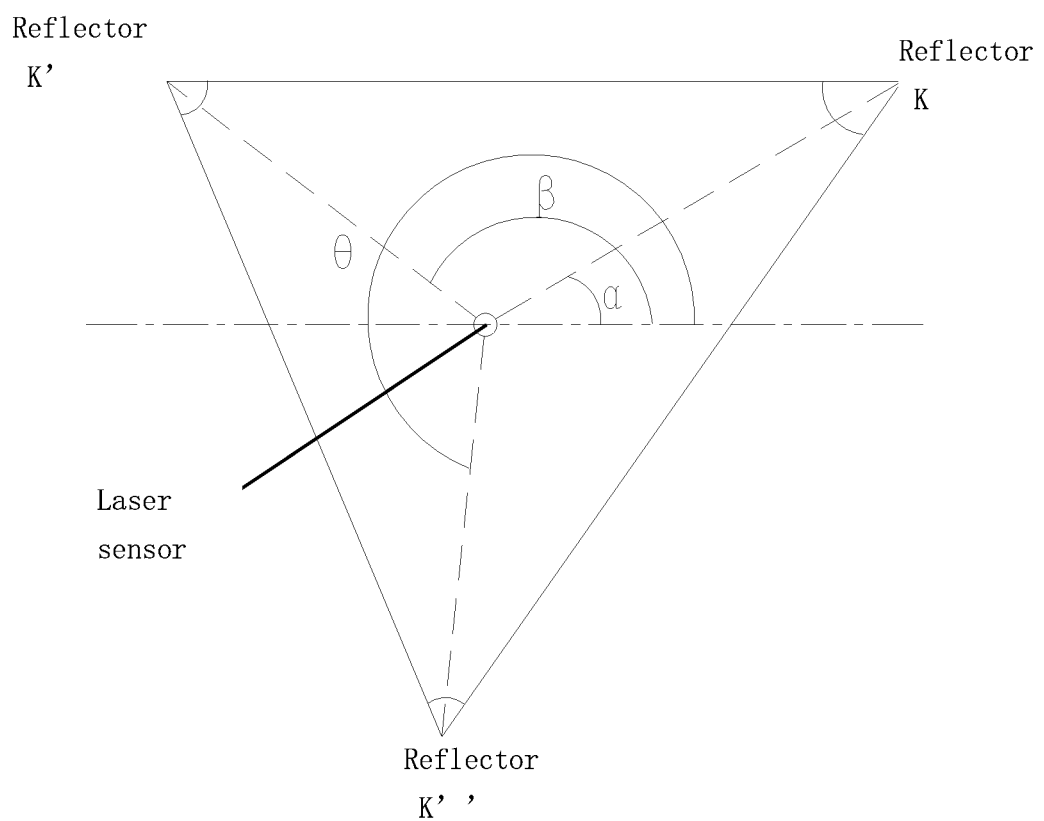
FIG. 1 shows a schematic view of an embodiment of the invention.

The present invention will be further described below with reference to accompanied drawings and exemplary embodiments. Here, identical numerals represent the identical components. In addition, detailed description of prior art will be omitted if it is unnecessary for illustration of the features of the present invention.

According to an embodiment of the invention, a reflector matching algorithm based on triangle perimeter matching is disclosed, in which the positions of a plurality of reflectors on a map are known and the number of reflectors detected by the laser sensor at the same time is not less than 3. The reflector matching algorithm includes the following steps of:

a. recording coordinate information of a plurality of reflectors in an AGV travel scene, generating a scene coordinate point layout, and determining the maximum detection distance of the laser sensor, wherein the coordinate information includes horizontal and vertical coordinates of the plurality of reflector in a two-dimensional coordinate system of the entire AGV travel scene;

b. taking and combining any three points in the scene coordinate point layout to form a plurality of basic triangles, calculating the perimeters of the basic triangles, the length of each side and the position of each vertex of the plurality of basic triangles, and saving the information in an AGV;

c. extracting the basic triangles of which the side length is smaller than or equal to twice of the maximum detection distance of the laser sensor;

d. scanning individual reflectors of the plurality of reflectors which are within the maximum detection distance at the current position of the AGV, obtaining a plurality of detection triangles through matching by taking the scanned reflectors as vertexes, and calculating the side lengths and perimeters of the detection triangles, wherein when the laser sensor scans the reflector, the angle information of the reflector and the distance information from the AGV to the reflector can be obtained, and the plurality of detection triangles can be obtained by matching the angle information and the distance information;

e. carrying out matching with the plurality of basic triangles by taking the perimeters of the plurality of detection triangles as features, and finding out all the basic triangles having consistent perimeter features with the detection triangles;

f. carrying out matching with all the basic triangles having consistent perimeter features matched in the step e by taking the side lengths of the plurality of detection triangles as features, and finding out all the basic triangles having consistent side length features with the detection triangles; and g. acquiring the position information of each vertex of all the detection triangles, and carrying out average fusion according to the position information of each vertex and in combination with a map and a world coordinate list so as to determine the real-time position of the current AGV.

Compared with the prior art, for the reflector matching algorithm based on triangle perimeter matching, as provided by one embodiment of the present invention, matching can be completed fast without need to know the position information at last moment by using the features of perimeters, corresponding side lengths or angles, and the like to obtain the real-time position of the laser sensor, and complex computations can be completed in advance. When the real-time position is detected, the real-time position coordinates of the laser sensor can be obtained only through simple computations and contrast fusion, the computation burden is greatly reduced, and the positioning efficiency is high.

Figure 2:
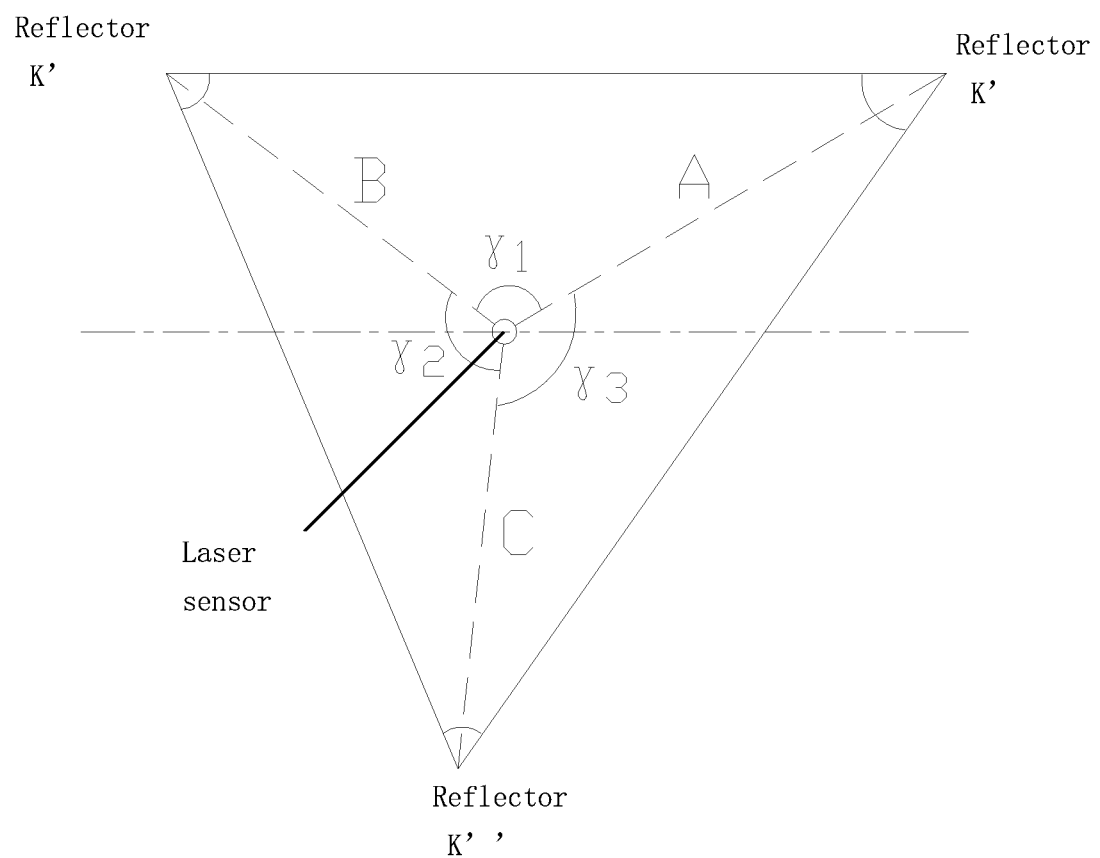
FIG. 2 also shows a schematic view of an embodiment of the invention.

Referring to FIGS. 1 and 2, as an embodiment of the instant invention, a laser sensor starts to scan counterclockwise from 0 degree in a horizontal direction and feeds back the angles and distances of scanned reflectors, and the distance length between every two detected reflectors is calculated according to the Cosine Law; the distance lengths and included angles of three sides of the detection triangle can be obtained by using the Cosine Law. The length of each side and the angle information of the detection triangle can be obtained through simple arithmetical computations, and the computation speed is high; by taking detection of three reflectors by the laser sensor as an example, the laser sensor scans three reflectors K, K' and K" and combines the three reflectors into a detection triangle, wherein the distance of the first reflector K scanned by the laser sensor is A, the angle is alpha, the distance of the second reflector K' scanned by the laser sensor is B, the angle is beta, the distance of the third reflector K' scanned by the laser sensor is C, and the angle is theta. It can be known that the included angle between the first reflector K and the second reflector K' is gamma 1=beta-alpha, the included angle between the second reflector K' and the third reflector K" is gamma 2=theta-beta, and the included angle between the third reflector K" and the first reflector K is gamma 3=360°-gamma 1-gamma 2. Then, the distance lengths and included angles of three sides of the detection triangle can be obtained by using the Cosine Law.

In an embodiment, for the step b, all the basic triangles are recorded in a basic triangle array with the perimeter as a subscript in the AGV, and the basic triangles with the same calculated perimeters are saved via a chain table.

In an embodiment, for the step c, the side length being smaller than or equal to twice of the maximum detection distance of the laser sensor means that if the detection range of the laser sensor is L1 mm, and the side length of the combined basic triangle does not exceed L2=(2*L1) mm. For example, if the detection range of the laser sensor is 20000 mm, the side length of the combined basic triangle does not exceed 40000 mm. All reflectors which can be combined into the basic triangles are ensured to be detected by the laser sensor.

In an embodiment, when the detection triangles match with the basic triangles by taking the perimeters as features, the array with certain perimeter error range as a subscript can be searched, and the basic triangles corresponding to the detection triangles can be found more accurately. For example, if the perimeter of the detection triangle is 12000 mm and the perimeter range is ±10 mm, the basic triangle array with 11990-12010 as a subscript is searched, and the basic triangles corresponding to the detection triangles can be found more accurately.

Though various embodiments of the present invention have been illustrated above, a person of the art will understand that, variations and improvements made upon the illustrative embodiments fall within the scope of the present invention, and the scope of the present invention is only limited by the accompanying claims and their equivalents.

The invention claimed is:

1. A method for determining a real-time position of an automated guided vehicle (AGV) by using a reflector matching algorithm based on triangle perimeter matching, the method comprising the following steps of:
   a) recording coordinate information of a plurality of reflectors in an AGV travel scene, generating a scene coordinate point layout, and determining a maximum detection distance of a laser sensor;
   b) taking and combining any three points in the scene coordinate point layout to form a plurality of basic triangles, calculating the perimeters of the basic triangles, the length of each side and the position of each vertex of the plurality of basic triangles, and saving the information in an AGV;
   c) extracting the basic triangles of which the side length is smaller than or equal to twice of the maximum detection distance of the laser sensor;
   d) scanning individual reflectors of the plurality of reflectors which are within the maximum detection distance at the current position of the AGV, forming a plurality of detection triangles by taking the scanned reflectors as vertexes of the plurality of detection triangles, and calculating the side lengths and the perimeters of the detection triangles;
   e) carrying out matching with the plurality of basic triangles by taking the perimeters of the plurality of detection triangles as features, and finding out all the basic triangles having consistent perimeter features with the detection triangles;
   f) carrying out matching with all the basic triangles having consistent perimeter features matched in the step e by taking the side lengths of the plurality of detection triangles as features, and finding out all the basic triangles having consistent side length features with the detection triangles; and
   g) acquiring the position information of each vertex of all the detection triangles, and according to the position information of each vertex and in combination with a map and a world coordinate list, determining the real-time position of the current AGV.

2. The method according to claim 1, wherein in the step d, when the laser sensor scans the reflector, the angle information of the reflector and the distance information from the AGV to the reflector can be obtained, and the plurality of detection triangles can be obtained by matching the angle information and the distance information.

3. The method according to claim 1, wherein for the step b, all the basic triangles are recorded in a basic triangle array with the perimeter as a subscript in the AGV, and the basic triangles with the same calculated perimeters are saved via a chain table.

4. The method according to claim 1, wherein for the step c, the side length being smaller than or equal to twice of the maximum detection distance of the laser sensor means that if the detection range of the laser sensor is L1 mm, the side length of the combined basic triangle does not exceed L2=(2*L1) mm.

5. The method according to claim 2, wherein for the step d, the laser sensor starts to scan counterclockwise from 0 degree in the horizontal direction and feeds back the angles and distances of the scanned reflectors, and the distance length between every two detected reflectors is calculated according to the Cosine Law; the distance lengths and included angles of three sides of the detection triangles can be obtained by using the Cosine Law.

6. The method according to claim 1, wherein for the step e, when matching is carried out with the basic triangles by taking the perimeters as features, the array with certain perimeter error range as a subscript can be searched.

* * * * *